UNITED STATES PATENT OFFICE.

HAROLD C. CHAPIN, OF CLEVELAND, OHIO, ASSIGNOR TO NATIONAL CARBON COMPANY, INC., A CORPORATION OF NEW JERSEY.

PROCESS OF FORMING MANGANESE PEROXID.

1,343,390. Specification of Letters Patent. Patented June 15, 1920.

No Drawing. Application filed June 29, 1917. Serial No. 177,697.

*To all whom it may concern:*

Be it known that I, HAROLD C. CHAPIN, a citizen of the United States, residing at Cleveland, in the county of Cuyahoga and State of Ohio, have invented a certain new and useful Improvement in Processes of Forming Manganese Peroxid, of which the following is a full, clear, and exact description.

This invention relates to a process of manufacturing manganese peroxid for battery depolarizers.

It is known that an energetic manganese peroxid depolarizer can be formed by subjecting manganese carbonate to an oxidizing roast, the roasted product being if desired further oxidized by means of suitable oxidizing agents in aqueous solution, as disclosed in the patent to M. L. Kaplan, No. 1,178,927 issued April 11, 1916.

The present invention is an improved process whereby the oxidization of manganese carbonate may be quickly and economically effected.

While the carbonate can be made from other compounds of manganese, on account of cheapness I prefer to obtain it by bringing together solutions of sodium carbonate and manganese sulfate, which produces the following reaction:

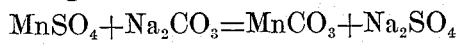

$$MnSO_4 + Na_2CO_3 = MnCO_3 + Na_2SO_4$$

When the manganese carbonate is made in this way, it requires a long period of roasting at a temperature from 325° to 425° to form the manganese peroxid. During roasting the following reaction takes place:

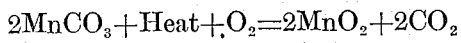

$$2MnCO_3 + Heat + O_2 = 2MnO_2 + 2CO_2$$

While experimenting on improved processes of manufacturing the carbonate and the subsequent roasting, I discovered that chlorids and chlorin containing materials have the remarkable property of greatly decreasing the time and temperature required for roasting, without apparently taking part in the chemical reactions. There are various chlorin compounds that produce the desired result, some of which may be mentioned by way of example, as: common salt (NaCl), ferric chlorid ($FeCl_3$), ammonium chlorid ($NH_4Cl$), potassium chlorate ($KClO_3$), potassium chlorid (KCl), calcium chlorid ($CaCl_2$), etc.

On account of cheapness I prefer to use sodium chlorid and employ it in proportions varying from ½ to 8 per cent. of the dry weight of the total materials involved. There does not seem to be any proportion of salt or other chlorid material necessary, but in general I have observed that the greater the per cent. of salt, the quicker the action.

There is no particular method required for incorporating the salt or other equivalent material in the carbonate mass, but I have secured good results by dissolving the salt in water and moistening the carbonate mass with the solution. After the carbonate has been moistened with the salt or equivalent solution, it can be heated in receptacles while hot air is passed over it to produce the oxidation.

Having described my invention, what I claim is:

1. The process of forming manganese peroxid, which consists in adding sodium chlorid to manganese carbonate and heating with access of air to drive off carbon dioxid and oxidize the residue.

2. Process of making a battery depolarizer comprising subjecting manganese carbonate admixed with a chlorin containing salt, to an oxidizing roast.

3. Process of making a battery depolarizer comprising subjecting manganese carbonate admixed with a metallic chlorid, to an oxidizing roast.

4. Process of making a battery depolarizer comprising subjecting manganese carbonate admixed with a chlorid of an alkali metal, to an oxidizing roast.

5. Process of making a battery depolarizer comprising subjecting to an oxidizing roast, manganese carbonate admixed with a metallic chlorid amounting to from ½ to 8 per cent. by weight of the dry manganese carbonate.

6. The steps in the process of forming manganese peroxid which consist in heating a mass of precipitated manganese carbonate admixed with sodium chlorid to drive off carbon dioxid and oxidize the residue of the manganese carbonate.

7. The steps in the process of forming manganese peroxid which consist in heating with access of air manganese carbonate admixed with sodium chlorid to dry the mix and to drive off carbon dioxid and oxidize the residue of the manganese carbonate.

8. The steps in the process of forming manganese peroxid which consist in moistening manganese carbonate with a solution of sodium chlorid and heating with access of air to drive off the moisture and carbon dioxid and oxidize the residue of the manganese carbonate.

9. The steps in the process of forming manganese peroxid which consist in moistening precipitated manganese carbonate with enough of a solution of sodium chlorid in water to provide an actual content of dry sodium chlorid amounting to from $\frac{1}{2}\%$ to 8% of the dry manganese carbonate by weight, and heating the resulting mass with access of air to drive off the water and carbon dioxid and oxidize the residue of the manganese carbonate.

In testimony whereof, I hereunto affix my signature.

H. C. CHAPIN.